United States Patent
Ikeda et al.

(10) Patent No.: US 7,484,890 B2
(45) Date of Patent: Feb. 3, 2009

(54) ROLLING SLIDE MEMBER

(75) Inventors: Takaaki Ikeda, Hamura (JP); Yoshiaki Sakaki, Hamura (JP); Kazuyoshi Kurihara, Oume (JP); Yoshitaka Waseda, Nissin (JP); Masanori Setsuda, Musashimurayama (JP); Kenichi Watanabe, Yamatotakada (JP)

(73) Assignee: Koyo Seiko Co., Ltd., Osaka-shi, Osaka (JP)

( * ) Notice: Subject to any disclaimer, the term of this patent is extended or adjusted under 35 U.S.C. 154(b) by 312 days.

(21) Appl. No.: 11/247,586

(22) Filed: Oct. 12, 2005

(65) Prior Publication Data

US 2006/0083455 A1    Apr. 20, 2006

(30) Foreign Application Priority Data

Oct. 13, 2004    (JP)    ............... 2004-298936

(51) Int. Cl.
*F16C 33/58*    (2006.01)
*F16C 33/64*    (2006.01)
*B21K 1/02*    (2006.01)
*B24B 1/00*    (2006.01)

(52) U.S. Cl. ............. 384/58; 29/898.06; 384/625; 451/49

(58) Field of Classification Search .......... 384/58, 384/276, 286–293, 492, 569, 625; 29/898.06, 29/898.066, 898.13; 451/49, 52, 62; 74/569
See application file for complete search history.

(56) References Cited

U.S. PATENT DOCUMENTS 4,973,068 A * 11/1990 Lebeck ............... 384/625
5,159,852 A    11/1992 Harimoto
5,704,720 A * 1/1998 Kumada et al. ............ 384/625
5,967,672 A    10/1999 Akamatsu et al.
6,012,851 A * 1/2000 Hirakawa et al. .......... 384/569
6,059,460 A * 5/2000 Ono et al. .................. 384/322
6,095,013 A * 8/2000 Hashimoto et al. ......... 384/625
6,852,015 B2 * 2/2005 Ito et al. ...................... 451/49

FOREIGN PATENT DOCUMENTS

| EP | 1 260 723 A2 | 11/2002 |
| GB | 2 216 200 A | 10/1989 |
| JP | 05-288221 | 11/1993 |
| JP | 5-306719 | 11/1993 |
| JP | 3146696 | 1/2001 |
| JP | 3326915 | 7/2002 |
| JP | 2004-36781 | 2/2004 |
| JP | 2005-090618 | 4/2005 |

OTHER PUBLICATIONS

European Search Report dated Jun. 27, 2008.

* cited by examiner

*Primary Examiner*—Thomas R Hannon
(74) *Attorney, Agent, or Firm*—McGinn IP Law Group, PLLC

(57) ABSTRACT

There is provided a rolling slide member coming in contact with a mating member in a rolling or sliding manner, wherein a plurality of grooves having an inclination of 0 to 30 degree and a groove depth of 0.5 to 15 μm are formed in a circumferential direction at the time of grinding a contact surface with the mating member. In the contact surface, the axial surface waviness is set to 0.1 or more in the filtered centerline waviness (WCA) and the axial surface roughness is set to 0.7 or more in the ten-point height of roughness profile (Rz) by the grooves 26.

19 Claims, 8 Drawing Sheets

AXIAL DIRECTION →
CIRCUMFERENTIAL DIRECTION ↓

22a  22b  22a
— 22

22a  22b  22a

ROLLING SLIDE MEMBER

BACKGROUND OF THE INVENTION

The present invention relates to a rolling slide member which comes in contact with a mating member, such as an outer race, inner race and a roller of a roller bearing, or a roller of a cam follower, in a rolling or sliding manner.

A roller of a cam follower as an example of the rolling slide member comes in contact with a cam of a cam shaft rotating with the rotation of a crank shaft of an engine. In the roller and the cam coming in contact with each other in a rolling manner, the outer circumferential surface of the cam (contact surface with the roller) is not subjected to the final polishing in accordance with its shape so as to have a great surface roughness and the outer circumferential surface of the roller (contact surface with the cam) is subjected to the polishing work. In this condition, peeling can easily occur in the outer circumferential surface of the roller. Accordingly, as a conventional surface treatment on the outer circumferential surface of the roller, after-machining such as barrel or shot blast is performed after grinding the contact surface, thereby giving the compressive residual stress to the surface layer of the outer circumferential surface of the roller, increasing the surface hardness, or forming pits (micro concave portions) serving as an oil accumulator on the outer circumferential surface of the roller. Since the peeling results from cracks or exfoliation of the surface due to plastic flow in the surface layer of the outer circumferential surface of the roller, the giving of the compressive residual stress or the increase in surface hardness suppresses the plastic flow of the surface layer, thereby preventing the generation of peeling (see Patent Document 1). However, in the conventional peeling-resistant structure, the expensive after-machining such as barrel or shot blast is required after the grinding work.

Patent Document 1: Japanese Patent No. 3146696

SUMMARY OF THE INVENTION

A main object of the present invention is to provide a rolling slide member, such as a roller of a cam follower, and races and a roller of a roller bearing, which makes an expensive after-machining unnecessary by giving a peeling-resistant structure to a contact surface of the rolling slide member with a mating member only by the use of a grinding work on the contact surface in the rolling slide member.

According to an aspect of the present invention, there is provided a rolling slide member which comes in contact with a mating member in a rolling or sliding manner, wherein a plurality of grooves having a slope of 0 to 30 degree and a groove depth of 0.5 to 15 µm are formed in a circumferential direction at the time of grinding a contact surface with the mating member. The grooves may be a plurality of single grooves or a continuous spiral groove.

The groove depth mentioned above indicates an average height (Rc) of roughness curve factors (JISB601-2001).

When the rolling slide member is, for example, a roller of a cam follower and the mating member is a cam, the outer circumferential surface of the roller, which is the contact surface with the cam, can have a lubricant retaining effect effective for preventing the generation of peeling by providing the grooves to the outer circumferential surface of the roller, thereby suppressing the generation of peeling. In addition, even when the peeling is generated, the propagation of the peeling can be prevented by the grooves and the expensive after-machining such as barrel or shot blast is not necessary after the grinding work, unlike the related art, thereby reducing the manufacturing cost.

It is preferable that the occupation ratio of the grooves to the entire circumference of the contact surface of the rolling slide member with the mating member is in the range of 80 to 100%.

The axial surface waviness of the contact surface may be 0.1 or more in the filtered centerline waviness (WCA) and an axial surface roughness may be 0.7 or more in the ten-point height of roughness profile (Rz) due to the grooves. It is preferable that WCA is in the range of 0.1 to 0.6 and Rz is in the range of 0.7 to 2.4. By setting the filtered centerline waviness (WCA) to 0.1 or more, it is possible to increase the lubricant retaining effect. In addition, by setting the axial surface roughness to 0.7 or more in the ten-point height of roughness profile (Rz), an initial familiarity component which slides on the outer circumferential surface of the cam as the mating member can be given.

In the peeling-resistant measure according to the related art, by the use of the expensive after-machining such as barrel or shot blast, a lubricant layer was secured and a fatigue strength was increased such that the outer circumferential surface stands until the surface roughness (unevenness) of the outer circumferential surface of the cam as the mating member is fitted with the surface roughness of the outer circumferential surface of the roller.

In the peeling-resistant measure according to the present invention, the after-machining for increasing the fatigue strength is not carried out. As a result, although it can be considered that the rolling slide member does not stand until the mating member is fitted to the rolling slide member, the peeling is not generated in the rolling slide member according to the present invention and the mating member and the rolling slide member are fitted with each other on the contact surface therebetween. The reason is, it is considered, that the aggression on the mating member is enhanced and the fitting speed of the mating member is enhanced, by setting the surface waviness and the surface roughness of the contact surface with the mating member as described above. Accordingly, in the present invention, it is not necessary to carry out the expensive after-machining such as barrel or shot blast after the grinding work and to give the compressive residual stress or to enhance the surface hardness.

When the filtered centerline waviness (WCA) is less than 0.1 and the ten-point height of roughness profile (Rz) is less than 0.7, the grooves is decreased in size, thereby making it difficult to discharge the wear particles. In addition, when the filtered centerline waviness (WCA) is greater than 0.6 and the ten-point height of roughness profile (Rz) is greater than 2.4, the size of the wear particles is relatively greater than the grooves, thereby making it difficult to discharge the wear particles. Since the area for retaining the lubricant is reduced when the grooves are worn away, the lubricant ability of the contact surface with the mating member may not be secured sufficiently.

The surface hardness of the contact surface of the rolling slide member with the mating member may be set to 613 to 800 in the Vickers hardness (Hv), and the compressive residual stress (MPa) thereof may be set to 0 to 600. This is because the contact surface can be smoothly fitted with the mating member.

In the contact surface of the rolling slide member with the mating member, it is preferable that the axial surface roughness of a center area thereof is set to 0.7 or more in the ten-point height of roughness profile (Rz), and the axial surface roughness of an end area is set to a surface roughness equal to or less than 90% of the ten-point height of roughness profile (Rz) of the center area in the ten-point height of roughness profile (Rz). This is because even when miss-alignment occurs in the state that the rolling slide member is in contact with the mating member, the contact surface of the rolling slide member with the mating member decreases in aggression on the mating member, thereby effectively preventing the generation of pitching.

In the grooves, it is preferable that the axial surface waviness has the reduced peak height (Rpk) 0.15 or more and the reduced valley depths (Rvk) 0.4 or more. This is because the initial familiarity of the contact surfaces of the rolling slide member and the mating member is improved and the characteristic of discharge of wear particles is improved, thereby suppressing the generation of peeling on the contact surface of the rolling slide member and preventing the excessive wear thereof.

According to the present invention, since the peeling-resistant structure can be given to the contact surface of the rolling slide member with the mating member only by the use of the grinding work on the contact surface, the expensive after-machining for preventing the generation of peeling is not necessary unlike the related art, thereby reducing the manufacturing cost.

DETAILED DESCRIPTION OF PREFERRED EMBODIMENTS

Hereinafter, a rolling slide member according to an embodiment of the present invention will be described with reference to the accompanying drawings. In the embodiments, a cam follower for a valve driving mechanism of an internal combustion engine is exemplified as the rolling slide member.

Figure 1:
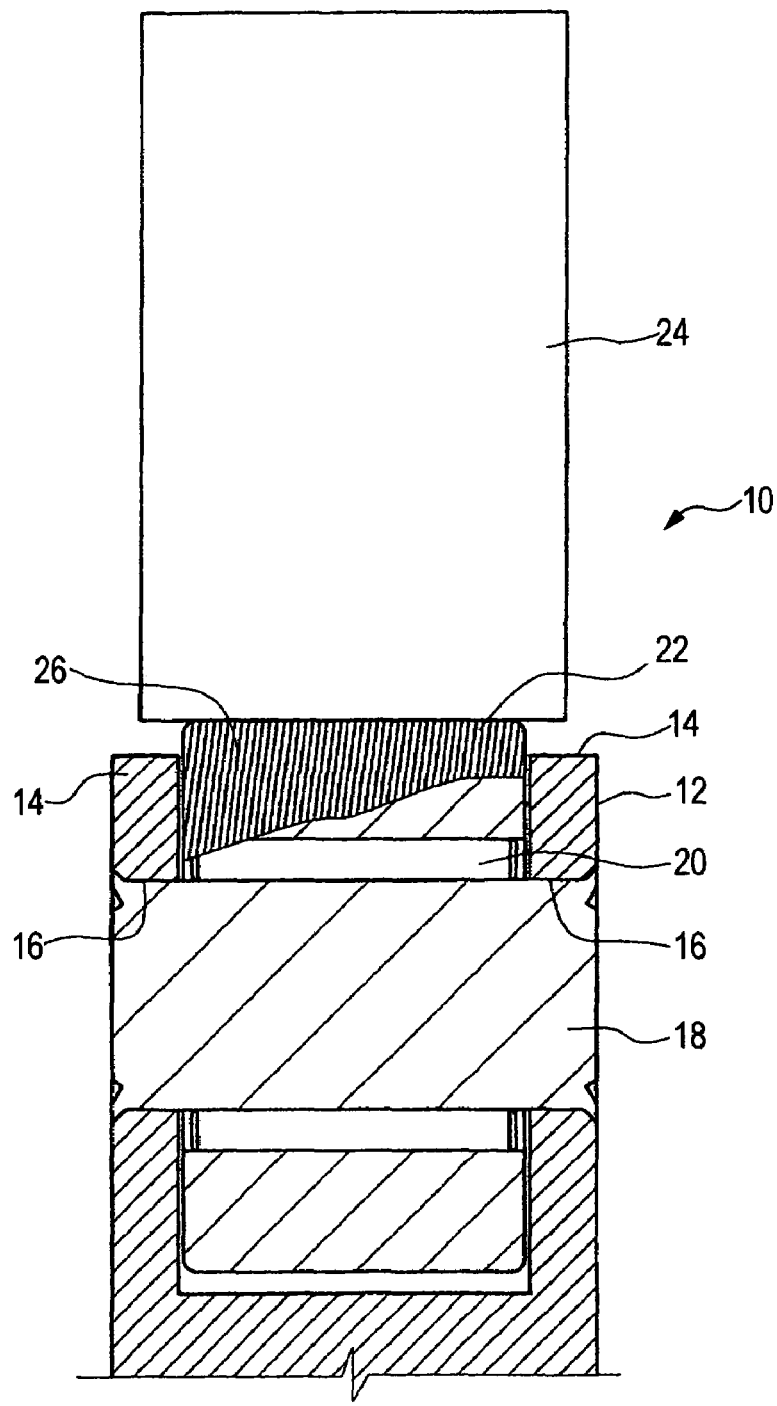
FIG. 1 is a cross-sectional view of a cam follower according to an embodiment of the present invention.
Figure 2:
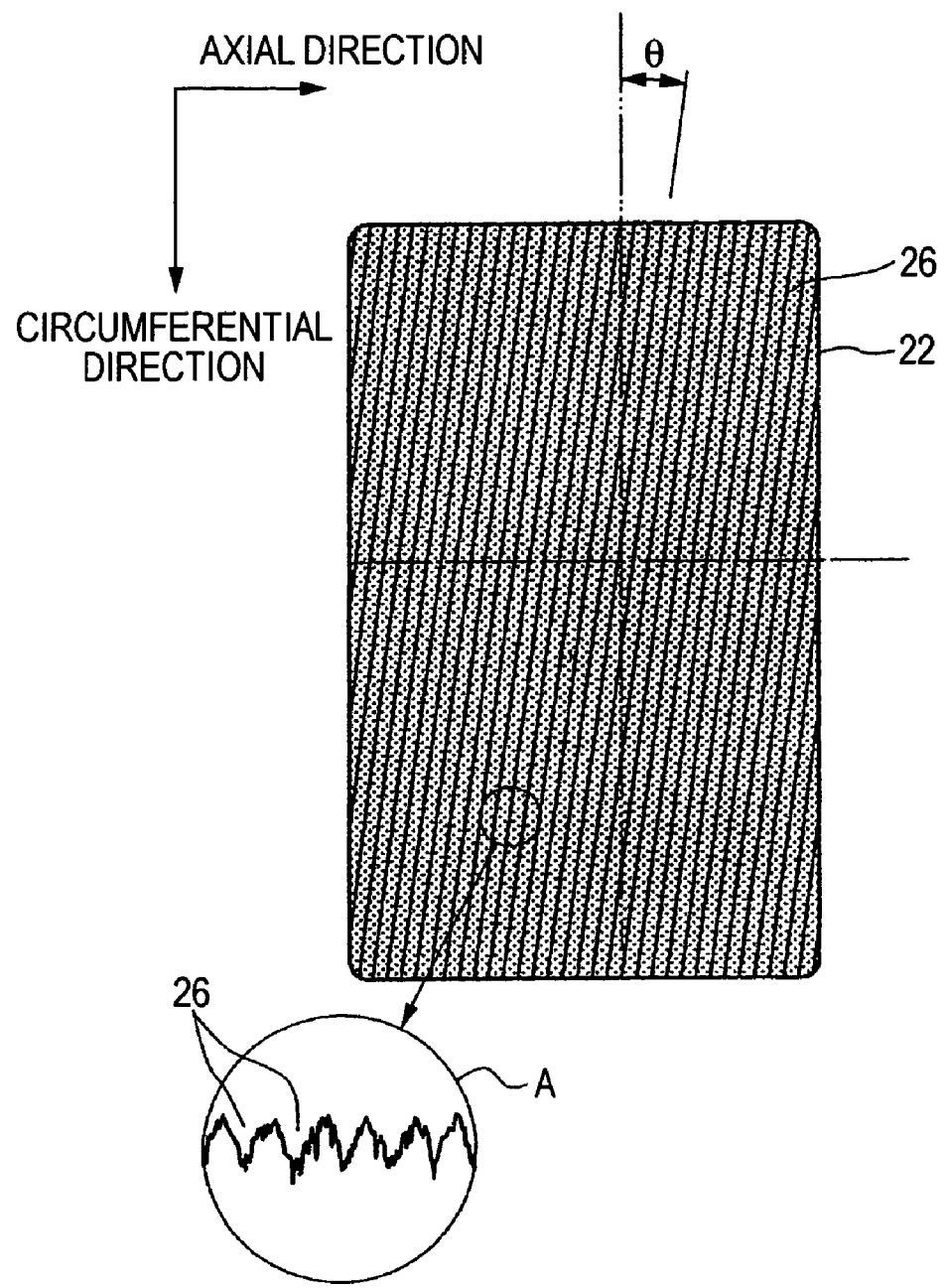
FIG. 2 is a side view of a roller provided in the cam follower shown in FIG. 1.
Figure 3:
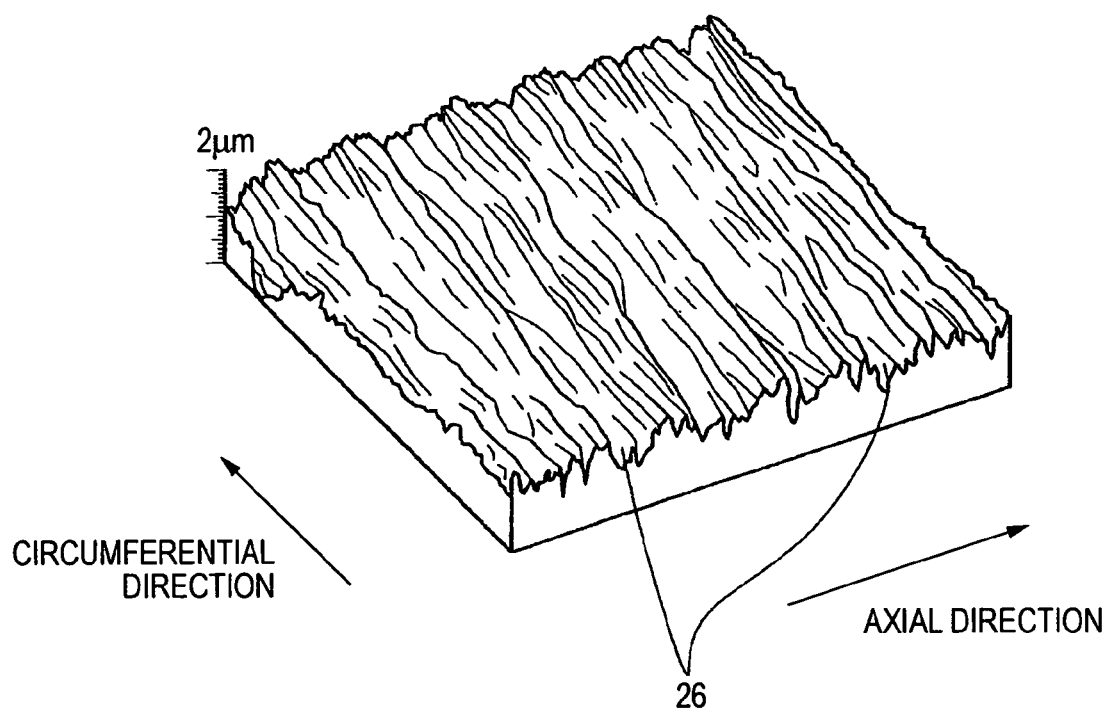
FIG. 3 is a perspective view illustrating an actual surface of the outer circumferential surface of the roller in 1 mm$^2$.
Figure 4A:
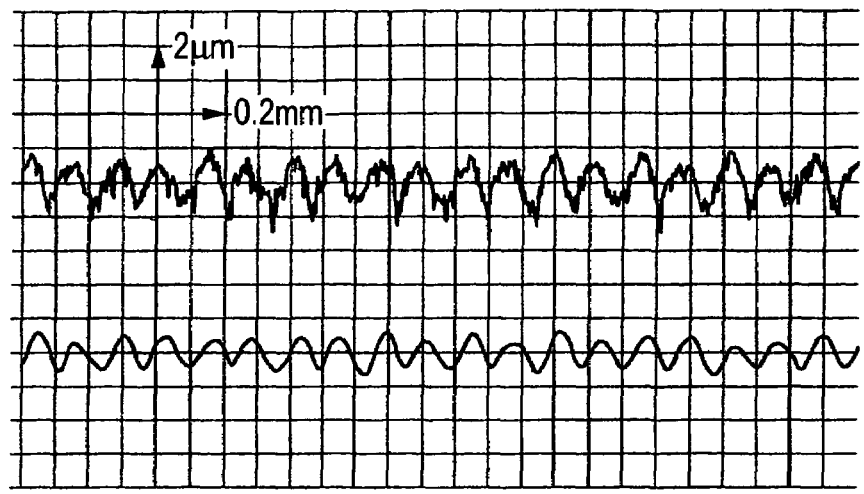
FIGS. 4A and 4B are diagrams illustrating a sectional curve in the axial direction of the actual surface of the outer circumferential surface of the roller measured with a surface roughness tester made in Kosaka Research Institute Co.
Figure 4B:
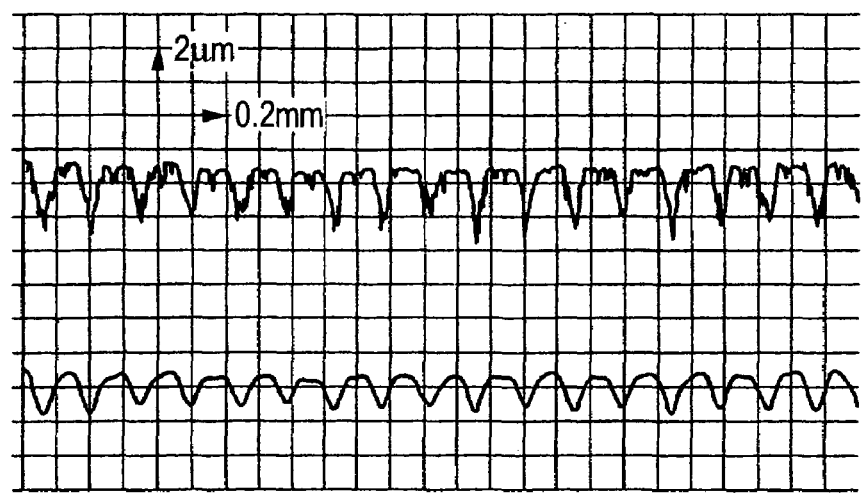
Figure 5:
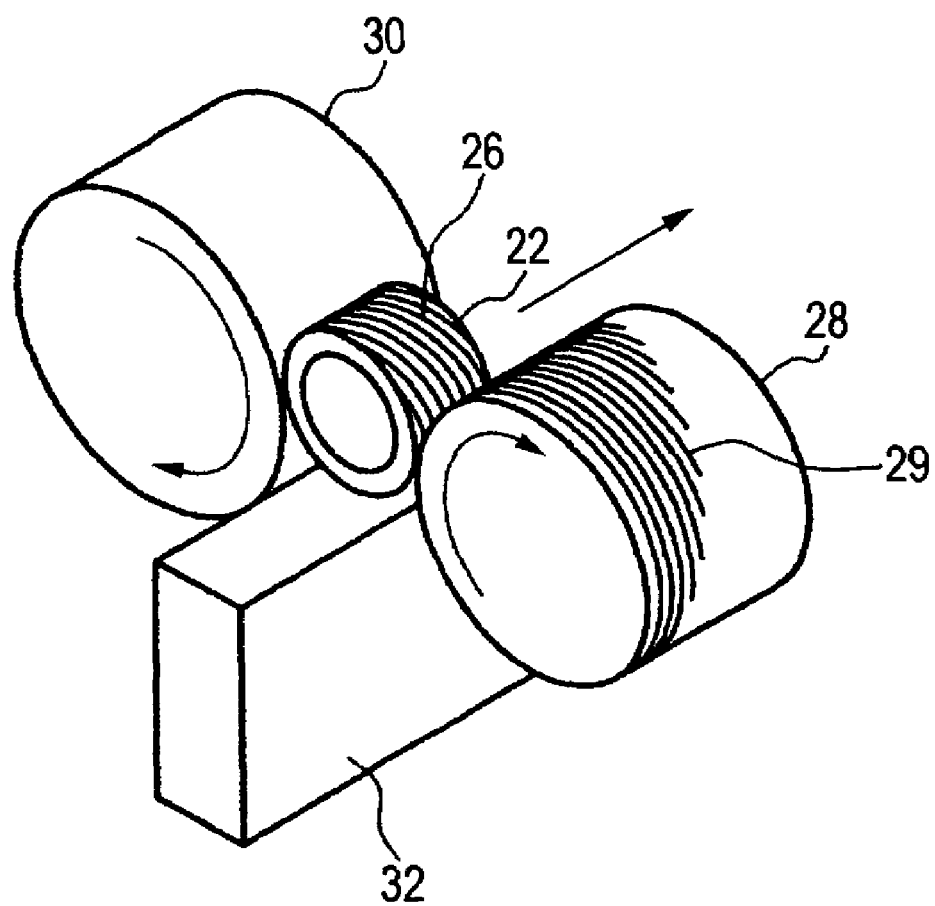
FIG. 5 is a conceptual diagram illustrating a centerless grinding machine for grinding the outer circumferential surface of the roller.

FIGS. 1 to 5 show a cam follower according to an embodiment of the present invention. FIG. 1 is a cross-sectional view of the cam follower. FIG. 2 is a side view of a roller provided in the cam follower. FIG. 3 is a perspective view illustrating an actual surface of the outer circumferential surface of the roller in 1 mm$^2$. FIGS. 4A and 4B are diagrams illustrating a sectional curve in the axial direction of the actual surface of the outer circumferential surface of the roller, which is measured with a surface roughness tester made in Kosaka Research Institute Co. FIG. 5 is a conceptual diagram illustrating a centerless grinding machine for grinding the outer circumferential surface of the roller. In FIG. 4, the abscissa has a unit of mm and the ordinate has a unit of μm, that is, the vertical magnification is ×5000 (5000 times) and the horizontal magnification is ×50 (50 times).

Referring to FIG. 1, the cam follower 10 according to the present embodiment includes a pair of opposed walls 14 constituting a cam follower body 12. A support shaft 18 is inserted into a shaft insertion hole 16 provided on the same axis of both opposed walls 14 and a roller 22 as a rolling slide member is rotatably fitted to and supported by an intermediate portion between both opposed walls 14 in the support shaft 18 through a plurality of needle-shaped rolling elements 20. A cam 24 comes in contact with the outer circumferential surface of the roller 22. The outer circumferential surface of the roller 22 serves a contact surface of the rolling slide member with the mating member (cam 24).

Referring to FIG. 2, plenty of grooves 26 with an inclination θ of 0 to 30 degree about the circumferential direction are formed on the outer circumferential surface of the roller 22 to be at the groove occupation ratio of 80% to 100% of the entire surface area. For the purpose of help with the understanding of the inclination of the grooves 26, hatched lines indicating the inclination of the grooves 26 are marked in FIG. 2. The inclination angle θ of the grooves is set to a proper angle between 0 and 30 degree in FIG. 2. The axial pitch of the grooves 26 is in the range of 0.05 to 0.30 mm and the depth thereof is in the range of 0.5 to 15 μm. The surface waviness of 0.1 or more in the filtered centerline waviness (WCA) in the axial direction and the surface roughness of 0.7 or more in the ten-point height of roughness profile (Rz) in the axial direction is given to the outer circumferential surface of the roller 22 by the grooves 26. The filtered centerline waviness (WCA) is a surface waviness defined in Japan Industrial Standard (JIS-B0601-1987) and the ten-point height of roughness profile (Rz) is a surface roughness defined in Japan Industrial Standard (JIS-B0601-1994). Since they are well known, the detailed description thereof will be omitted. In FIG. 2, a part of the outer circumferential surface of the roller is enlarged and shown in a circle A.

Referring to FIG. 3, the grooves 26 are formed on the actual surface of the outer circumferential surface of the roller 22 and the surface waviness which is one of surface features is given to the actual surface in the axial direction by the grooves 26. The surface waviness is 0.1 or more in the filtered centerline waviness (WCA) as described above. Plenty of unevenness is formed on the actual surface of the outer circumferential surface of the roller 22 to make the surface rough and the surface roughness is 0.7 or more in the ten-point height of roughness profile (Rz) which is one of the surface features as described above.

A sectional curve in the axial direction of the actual surface of the outer circumferential surface of the roller measured with a surface roughness tester made in Kosaka Research Institute Co. is shown in FIGS. 4A and 4B. The tester performs measurement by pressing a probe displacement type pickup on the axial end surface of the roller in the perpendicular direction thereto and a roughness curve and a filtered centerline waviness curve can be obtained from the measured sectional curve. The ten-point height of roughness profile (Rz) can be obtained from the roughness curve. In addition, the filtered centerline waviness (WCA) can be obtained from the filtered centerline waviness curve. FIG. 4A shows the filtered centerline waviness curve corresponding to the center area 22b of the roller shown in FIG. 6 to be described later and FIG. 4B shows the filtered centerline waviness curve corresponding to the end area 22a of the roller shown in FIG. 6 to be described later.

A method of grinding the outer circumferential surface of the roller 22 will be described with reference to FIG. 5. FIG. 5 is a conceptual diagram of a centerless grinding machine. In the embodiment, the outer circumferential surface of the roller 22 is ground in a centerless manner. The roller 22 as an object of the centerless grinding is placed between a grinding roll (grinding stone) 28 and a transfer roll 30 and is transferred in the arrow direction of the figure. Since the grinding roll 28 and the transfer roll 30 rotate in the clockwise direction, the roller 22 rotates in the counterclockwise direction. Since the circumferential velocity of the grinding roll 28 is greater than that of the transfer roll 30 and the roller 22 placed on a blade 32 is braked by the low-speed transfer roll 30 and the blade 32, the outer circumferential surface of the roller 22 is ground by the grinding roll 28 having the greater circumferential velocity. Since the rotation axis of the transfer roll 30 is tilted slightly in the transfer direction of the roller 22 about the roller 22, the roller 2 is transferred toward the right back side from the left front side while being ground.

In the centerless grinding machine, plenty of convex portions 29 having an inclination angle of 0 degree, an axial pitch of 0.05 to 0.30 mm, and a height of 0.5 to 15 μm are provided in the circumferential direction on the outer circumferential surface of the grinding roll 28 and the grinding roll 28 has a surface shape corresponding to the surface waviness and the surface roughness of the outer circumferential surface of the roller 22. The transfer speed of the transfer roll 30 can be controlled based on the inclination angle of the grooves 26 to be formed on the outer circumferential surface of the roller 22 The rotation of the grinding roll 28 or the transfer roll 30 is controlled by a control unit not shown, for example, a microcomputer.

In the centerless grinding machine, the grooves 26 are formed on the outer circumferential surface of the roller 22 by the use of the convex portions 29 of the grinding roll 28 and the axial surface waviness and the axial surface roughness are transferred onto the outer circumferential surface of the roller 22, by controlling the transfer speed of the transfer roll 30. As a result, plenty of grooves can be formed on the outer circumferential surface of the roller with the groove occupation ratio of 80 to 100% about the entire circumference, the inclination of 0 to 30 degree about the circumferential direction, the axial pitch of 0.05 to 0.30 mm, and the depth of 0.5 to 15 μm. In addition, the axial surface waviness of 0.1 or more in the filtered centerline waviness (WCA) and the axial surface roughness of 0.7 or more in the ten-point height of roughness profile (Rz) can be given to the outer circumferential surface of the roller.

In the roller 22 having the above-mentioned structure, an effect of suppressing the generation of peeling will be described. The protrusions (roughness protrusions) due to the surface roughness of the outer circumferential surface of the roller 22 commonly slide on and are fitted with the roughness protrusions of the outer circumferential surface of the cam 24, thereby suppressing the generation of peeling. In addition, the lubricant is retained in the grooves on the outer circumferential surface of the roller 22. In this case, in the present embodiment, only the grinding work is performed to the outer circumferential surface of the roller 22 but a machining for improving the fatigue strength is not performed thereto. However, the aggression on the outer circumferential surface of the cam 24 is enhanced by the roughness protrusions on the outer circumferential surface of the roller 22 and thus the fitting speed of the outer circumferential surface of the cam 24 with the outer circumferential surface of the roller 22 is enhanced, thereby suppressing the generation of peeling. Therefore, in the present embodiment, the expensive after-machining such as barrel or shot blast for enhancing the fatigue strength is not required after the grinding work, thereby remarkably reducing the manufacturing cost.

In the roller 22 having the above-mentioned structure, since the grooves having the inclination of 0 to 30 degree about the circumferential direction are formed on the outer circumferential surface of the roller 22, the lubricant can be effectively supplied to the contact surface between the outer circumferential surface 22 of the cam 24 and the outer circumferential surface of the roller 22, thereby suppressing the generation of peeling. In addition, since the surface waviness of the outer circumferential surface of the roller 22 is set to 0.1 or more in the filtered centerline waviness (WCA), the lubricant can be more effectively retained between the outer circumferential surface of the cam 24 and the outer circumferential surface of the roller 22 and the retained lubricant is supplied to the grooves to prevent the exhaust of the lubricant on the contact surface, thereby more effectively preventing the generation of peeling. In addition to the surface waviness, since the surface roughness is set to 0.7 or more in the ten-point height of roughness profile (Rz), the lubricant can be retained in the unevenness on the contact surface resulting from the surface roughness and the retained lubricant is supplied to the grooves to prevent the exhaust of the lubricant on the contact surface, thereby more effectively suppressing the generation of peeling. In addition, the outer circumferential surface of the roller can be easily fitted with the outer circumferential surface of the cam through the common sliding, thereby effectively suppressing the generation of peeling. Even when the peeling is generated on the outer circumferential surface of the roller 22, the peeling is not easily propagated.

Figure 7:
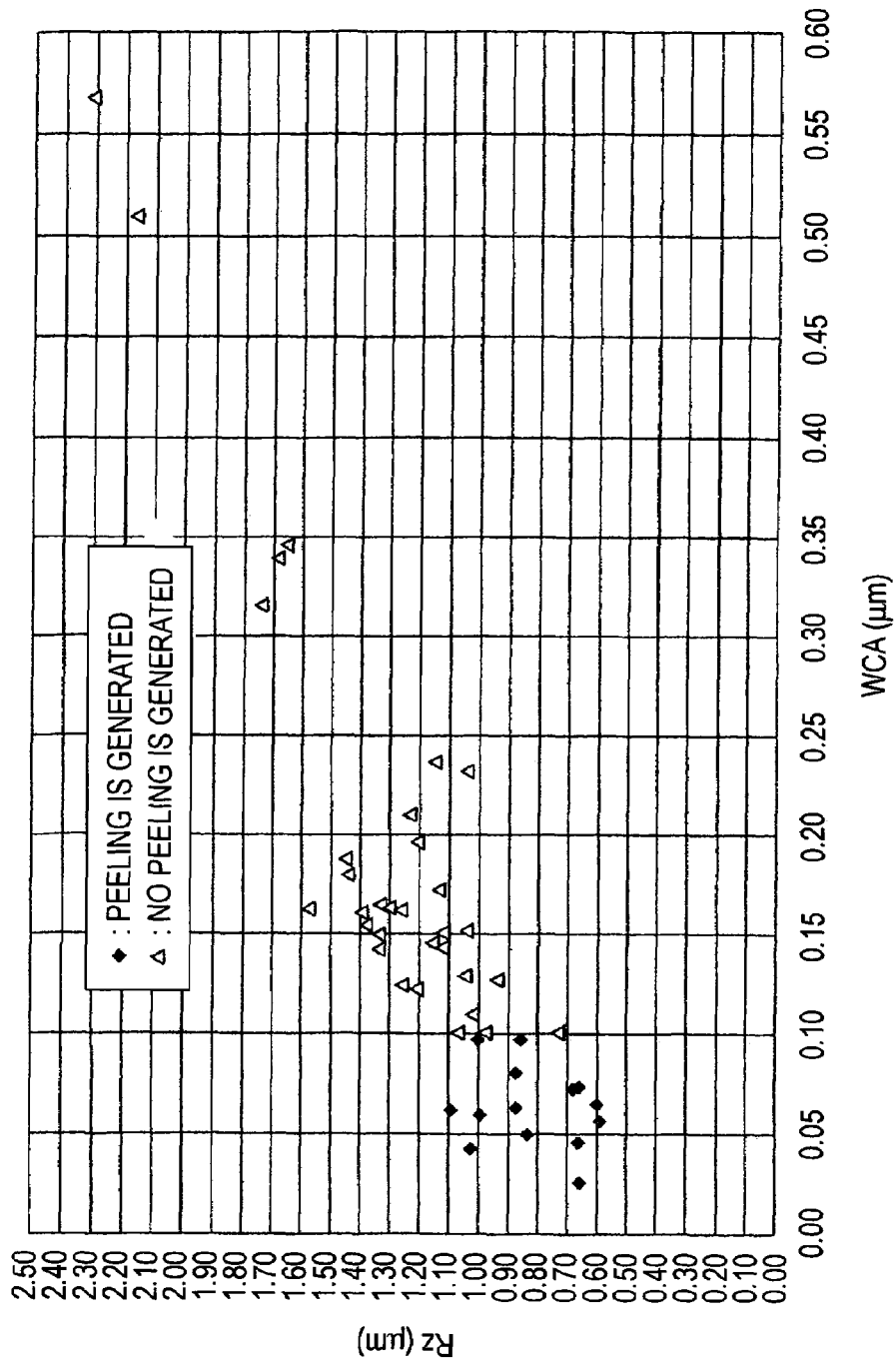
FIG. 7 is a graph illustrating the test result for the relational performance between WCA and Rz by using the roller according to the present invention as a sample.

By using a roller having grooves with an inclination of 0 to 30 degree and a groove depth of 0.5 to 15 μm as a sample, the test result for the performance with using a radial lifetime tester is shown in FIG. 7 with showing a relation between the performance, and the filtered centerline waviness (WCA) and the ten-point height of roughness profile (Rz). The test condition is as follows. That is, the radial load is ⅕ of the rated load, the number of rotation is 6500 r/min, the lubricant is GF3 (0W-20), the supply method is a splashing, and the temperature of oil is 130° C. In the sample being 0.1 or more in WCA and 0.7 or more in Rz, it can be seen that no peeling is generated.

Since the barrel machining or the shot blast machining conventionally required after performing the grinding work to the outer circumferential surface of the roller 22 can be omitted, the manufacturing cost can be reduced. In addition, since the barrel machining can be omitted, the fabrication line for the cam follower can be greatly simplified.

In Japanese Unexamined Patent Application Publication No. H5-306719, there is disclosed a technique that performs the grinding work to the rolling surface of a rolling element with a grid, finishes the roughness of the finishing surface to make the convex portions smooth and flat, and sets the intersection angle of the grid to 60 degree or more. However, since the grid machining should be necessarily carried out two times in the technique disclosed in the publication, the cost increases. In addition, since the intersection angle of the grid is set to 60 degree or more, the resistance between the outer circumferential surface of the roller and the outer circumferential surface of the cam increases, thereby wearing the outer circumferential surface of the cam. In the present embodiment, since the grooves can be formed only by the grinding work, the machining cost is reduced and since the inclination angle of the grooves is 30 degree or less, the resistance between the outer circumferential surface of the roller and the outer circumferential surface of the cam is small, thereby making it difficult to wear the outer circumferential surface of the cam.

Now, other embodiments of the present invention will be described.

(1) In a roller 22 according to another embodiment of the present invention, grooves 26 having an inclination of 0 to 30 degree about the circumferential direction, an axial pitch of 0.05 to 0.30 mm, and a depth of 0.5 to 15 μm are formed on 80 to 100% of the entire circumference on the outer circumferential surface, and the surface hardness may be set to 613 to 800 Hv and the compressive residual stress may be set to 0 to 600 MPa, such that the outer circumferential surface of the roller 2 can be smoothly fitted with the outer circumferential surface of the cam 24 as a mating member.

According to the present embodiment, since the grooves 26 having an inclination of 0 to 30 degree are formed on the outer circumferential surface of the roller 22, the lubricant can be effectively supplied to the contact surface between the outer circumferential surface of the cam 24 and the outer circumferential surface of the roller 22, thereby suppressing the generation of peeling. In addition, since the surface hardness of the outer circumferential surface of the roller 22 is set to 613 to 800 Hv and the compressing residual stress is set to 0 to 600 MPa, the outer circumferential surface of the cam 24 can be smoothly fitted with the outer circumferential surface of the roller 22, thereby more effectively suppressing the generation of peeling. Moreover, the outer circumferential surface of the cam 24 can be easily fitted in a common sliding manner at the time of initial contact, thereby effectively suppressing the generation of peeling.

Since the barrel machining or the shot blast machining conventionally required after performing the grinding work to the outer circumferential surface of the roller 22 can be omitted, the manufacturing cost can be reduced. In addition, since the barrel machining can be omitted, the fabrication line for the cam follower can be greatly simplified.

Figure 6A:
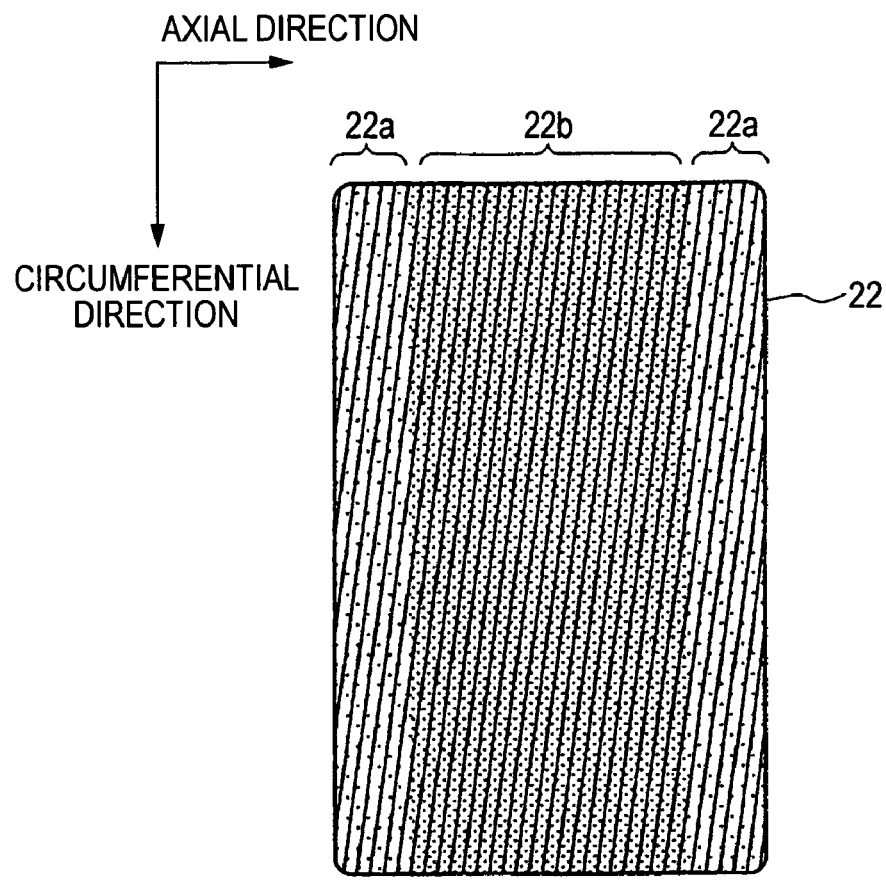
FIGS. 6A and 6B are a side view and a sectional conceptual view of a roller provided in a cam follower according to another embodiment of the present invention.
Figure 6B:
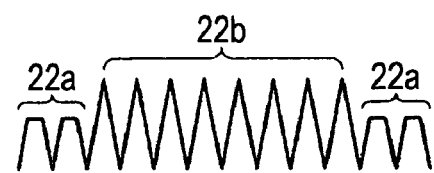

(2) In another embodiment of the present invention, grooves having an inclination of 0 to 30 degree about the circumferential direction, a groove pitch of 0.05 to 0.30 mm, and a groove depth of 0.5 to 15 μm are formed on 80 to 100% of the entire circumference on the outer circumferential surface of a roller 22. In addition, as shown in FIGS. 6A and 6B, the outer circumferential surface of the roller 22 is divided into both end areas 22a and a center area 22b between both end areas 22a, the surface roughness of the center area 22b is set to 0.7 or more in the ten-point height of roughness profile (Rz), and the surface roughness of the end areas 22a is set to a roughness being 90% or less of the ten-point height of roughness profile (Rz) of the center area 22b in the ten-point height of roughness profile (Rz). FIG. 6A shows a side surface of the roller 22 and FIG. 6B conceptually shows the surface roughness on the outer circumferential surface of the cam in the axial section of the FIG. 6A. In this case, the end areas 22a occupy 5 to 40% of the entire area of the outer circumferential surface of the roller 22 and the center area 22b between both end areas 22a occupies 20 to 90% of the entire area. In order to set the surface roughness of the end areas 22a to the roughness being 90% or less of the ten-point height of roughness profile (Rz) of the center area 22b, the end areas 22a should be pressed, and the pressing can be performed, for example, through a buff machining, a super-finishing grinding, and a stamping die. The compressive residual stress is not given in consideration of the fitting property with the outer circumferential surface of the cam as the mating member.

According to the present embodiment, since the grooves 26 having an inclination of 0 to 30 degree about the circumferential direction are formed on the outer circumferential surface of the roller 22, the lubricant can be effectively supplied to the contact surface between the outer circumferential surface of the cam 24 and the outer circumferential surface of the roller 22, thereby suppressing the generation of peeling. In addition, since the surface roughness of the center area 22b on the outer circumferential surface of the roller 22 is set to 0.7 or more in the ten-point height of roughness profile (Rz) and the surface roughness of the end areas 22a is set to 90% or less of the surface roughness of the center area 22b in the ten-point height of roughness profile (Rz), the end areas 22a serves as a roughness enhancing portion and the center area 22b serves as a non-roughness enhancing portion. Accordingly, when miss alignment is generated, the aggression on the outer circumferential surface of the cam as the mating member is decreased, thereby effectively suppressing the generation of peeling. Moreover, it is also possible to form the end areas 22a or the center area 22b with the reduced number of process steps and a specification low in cost.

(3) In another embodiment of the present invention, grooves having an inclination of 0 to 30 degree about the circumferential direction, a groove pitch of 0.05 to 0.30 mm, and a groove depth of 0.5 to 15 μm may be formed in 80 to 100% of the entire circumference on the outer circumferential surface of the roller 22, the reduced peak height (Rpk) may be set to 0.15 or more, and the reduced valley depths (Rvk) may be set to 0.4 or more. The reduced peak height (Rpk) and the reduced valley depths (Rvk) are defined in Japan Industrial Standard (JIS-B0671-2-2002).

The reduced peak height (Rpk) is defined as average height of protruding peaks above roughness core profile and the reduced valley depths (Rvk) is defined as average depth of valleys projecting through the roughness core profile.

In the present embodiment, since the grooves having an inclination of 0 to 30 degree about the circumferential direction are formed on the outer circumferential surface of the roller 22, the lubricant can be effectively supplied to the contact surface between the outer circumferential surface of the cam 24 and the outer circumferential surface of the roller 22, thereby suppressing the generation of peeling. In addition, since the outer circumferential surface of the roller 22 is set to 0.15 or more in the reduced peak height (Rpk), the initial fitting property of the contact surface can be improved, thereby reducing the wear particles. Moreover, since the reduced valley depths (Rvk) is set to 0.4 or more, it is possible to improve the discharge property of the wear particles.

Figure 8:
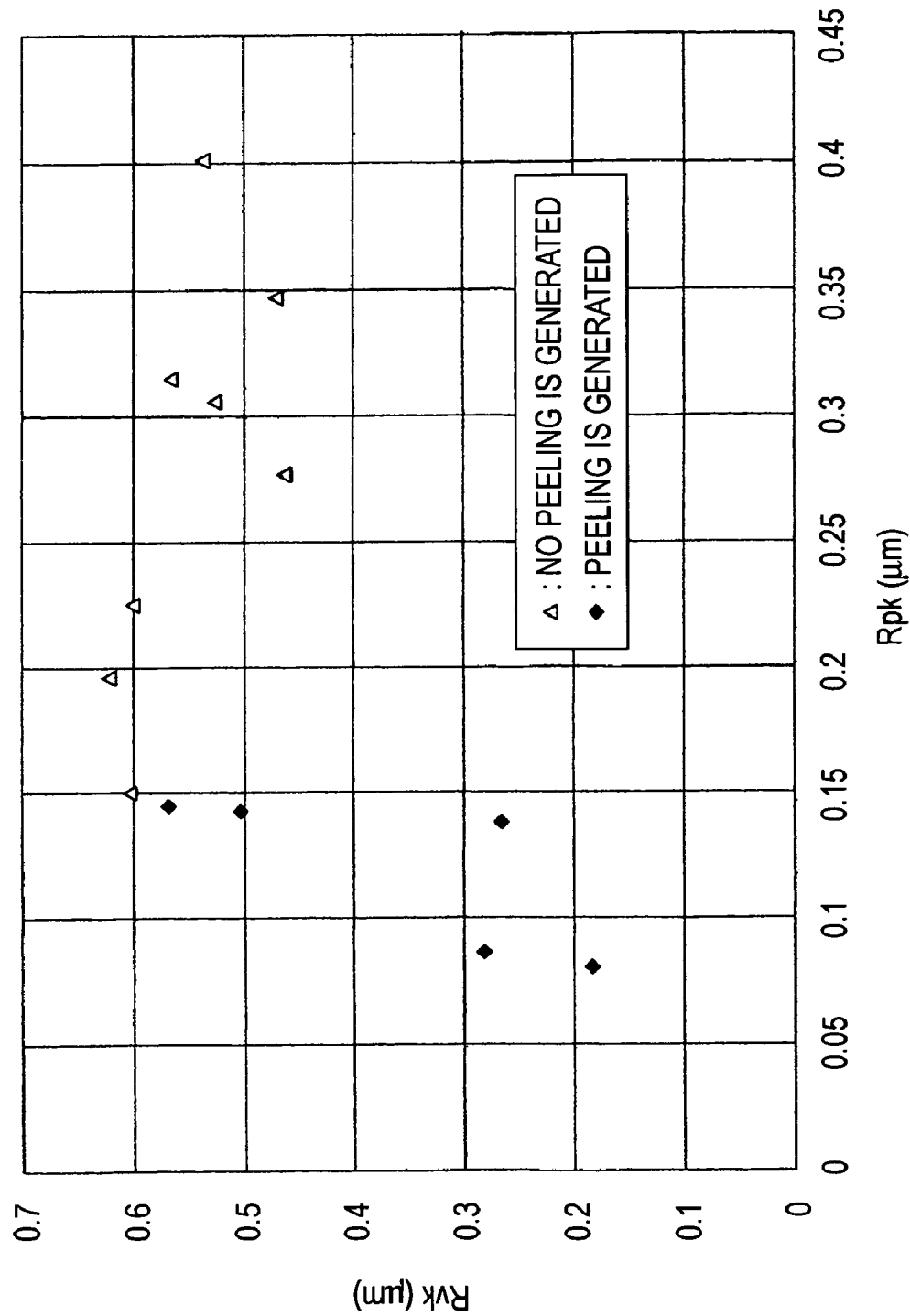
FIG. 8 is a graph illustrating the test result for the relational performance between Rpk and Rvk by using the roller according to the present invention as a sample.

The test result for the performance with showing relation between the performance, and the reduced peak height (Rpk) and the reduced valley depths (Rvk) is shown in FIG. 8. The tester and the test condition are similar to those of the test for the relational performance between the filtered centerline waviness (WCA) and the ten-point height of roughness profile (Rz). The inclination range of the grooves or the groove depth range of the sample is similar to that of the roller tested above. As a result, in the sample having the reduced peak height (Rpk) being 0.15 or more and the reduced valley depths (Rvk) being 0.4 or more, it can be seen that no peeling is generated.

(4) In the present invention, an outer raceway surface and an inner raceway surface of a roller bearing and a rolling surface of a roller can be used as the rolling slide member.

What is claimed is:

1. A rolling slide member for contacting a mating member in a rolling or sliding manner, comprising:
   a contact surface having a plurality of ground grooves, said plurality of ground grooves having an inclination in a range from 0 degrees to 30 degrees about a circumferential direction and a groove depth in a range from 0.5 µm to 15 µm, said contact surface of the rolling slide member coming in contact with the mating member.

2. The rolling slide member according to claim 1, wherein, by the grooves, an axial surface waviness of the contact surface is set to 0.1 or more in a filtered centerline waviness (WCA) and an axial surface roughness thereof is set to 0.7 or more in a ten-point height of roughness profile (Rz).

3. The rolling slide member according to claim 1, wherein a surface hardness of said contact surface of said rolling slide member is set in a range from 613 to 800 in Vickers hardness (Hv), and
   wherein a compressive residual stress (MPa) of said contact surface of said rolling slide member is set in a range from 0 to 600.

4. The rolling slide member according to claim 1, wherein an axial surface roughness of a center area of the contact surface is set to 0.7 or more in a ten-point height of roughness profile (Rz), and
   wherein the axial surface roughness of an end area of the contact surface is set to a surface roughness equal to or less than 90% of the ten-point height of roughness profile (Rz) of the center area.

5. The rolling slide member according to claim 1, wherein an average height (Rpk) of protruding peaks above a roughness core profile of the contact surface is set to 0.15 or more and an average depth (Rvk) of valleys projecting through the roughness core profile is set to 0.4 or more, by the grooves.

6. A cam follower for housing a rolling slide member, comprising:
   a cam follower body, comprising:
      a pair of opposed walls;
      a support shaft inserted into a shaft insertion hole provided on a same axis as said pair of opposed walls;
      said rolling slide member for contacting a mating member in a rolling or sliding manner, said rolling slide member rotatably fitted to and supported by an intermediate portion between said pair of opposed walls through a plurality of needle rolling elements, said member comprising:
         a contact surface having a plurality of ground grooves, said plurality of ground grooves having an inclination in a range from 0 degrees to 30 degrees about a circumferential direction and a groove depth in a range from 0.5 µm to 15 µm, said contact surface of the rolling slide member coming in contact with the mating member.

7. The cam follower according to claim 6, wherein said grooves have an axial pitch in a range from 0.05 mm to 0.30 mm.

8. A method of grinding a contact surface of a rolling slide member, comprising:
   grinding said contact surface of said rolling slide member such that said contact surface has a plurality of ground grooves, said plurality of ground grooves having an inclination in a range from 0 degrees to 30 degrees about a circumferential direction and a groove depth in a range from 0.5 µm to 15 µm, said grinding comprising:
      placing said rolling slide member on a blade between a grinding roll and a transfer roll; and
      rotating said grinding roll and said transfer roll such that said grinding roll grinds and forms said plurality of ground grooves in said contact surface of said rolling slide member.

9. The method of grinding according to claim 8, wherein said rolling slide member rotates in a counterclockwise direction, and
   wherein said transfer roll and said grinding roll rotate in a clockwise direction.

10. The method of grinding according to claim 9, wherein said transfer roll has a rotation axis tilted in said counterclockwise direction.

11. The method of grinding according to claim 9, wherein said transfer roll and said blade brake said rolling slide member in said clockwise direction.

12. The method of grinding according to claim 8, wherein said grinding roll has a greater circumferential velocity than that of said transfer roll.

13. The method of grinding according to claim 8, wherein said grinding is performed in a centerless manner.

14. The method of grinding according to claim 8, wherein said rolling slide member comprises an outer raceway surface and an inner raceway surface of a roller bearing and a rolling surface of a roller.

15. The method of grinding according to claim 8, wherein said plurality of ground grooves are formed on 80% to 100% of said contact surface of said rolling slide member, and
   wherein said plurality of ground grooves have an axial pitch in a range of 0.05 mm to 0.30 mm.

16. The method of grinding according to claim 15, further comprising:
   forming said plurality of ground grooves by using a plurality of convex portions of said grinding roll; and
   forming an axial surface waviness and an axial surface roughness on the contact surface of the rolling slide member by controlling a transfer speed of said transfer roll,
   wherein said axial surface waviness is 0.1 or more in a filtered centerline waviness (WCA), and
   wherein said axial surface roughness is 0.7 or more in a ten-point height of roughness profile (Rz).

17. The method of grinding according to claim 15, wherein a surface hardness of said contact surface of said rolling slide member is in a range from 613 Hv to 800 Hv, and
   wherein a compressive residual stress of said contact surface of said rolling slide member is in a range from 0 MPa to 600 MPa.

18. The method of grinding according to claim 15, wherein said contact surface of said rolling slide member comprises:
   two end areas occupying 5% to 40% of said contact surface of said rolling slide member; and
   a center area between said two end areas, said center area occupying 20% to 90% of said contact surface of said rolling slide member,
   wherein a surface roughness of said center area is 0.7 or more in a ten-point height of roughness profile (Rz), and
   wherein a surface roughness of said two end areas is 90% or less of a ten-point height of roughness profile (Rz) of said center area in said ten-point height of roughness profile (Rz).

19. The method of grinding according to claim 17, wherein said plurality of ground grooves have an average height (Rpk) of protruding peaks above a roughness core profile of the contact surface that is set to 0.15 or more, and
   wherein said plurality of ground grooves have an average depth (Rvk) of valleys projecting through the roughness core profile that is set to 0.4 or more.

* * * * *